May 8, 1951 R. M. M. OBERMAN 2,551,693

RECEIVING DEVICE FOR TELEPRINTERS

Filed Aug. 6, 1947 4 Sheets-Sheet 1

Inventor
Roelof Maarten Marie Oberman
by Michael S. Striker
Agt

May 8, 1951 R. M. M. OBERMAN 2,551,693

RECEIVING DEVICE FOR TELEPRINTERS

Filed Aug. 6, 1947 4 Sheets-Sheet 2

Inventor
Roelof Maarten Marie Oberman
by Michael S. Striker
Agent

Inventor
Roelof Maarten Marie Oberman
by Michael S. Striker
Agent

May 8, 1951 R. M. M. OBERMAN 2,551,693

RECEIVING DEVICE FOR TELEPRINTERS

Filed Aug. 6, 1947 4 Sheets-Sheet 4

Inventor
Roelof Maarten Marie Oberman
By Michael S. Striker
Agent

Patented May 8, 1951

2,551,693

UNITED STATES PATENT OFFICE 2,551,693

RECEIVING DEVICE FOR TELEPRINTERS

Roelof M. M. Oberman, The Hague, Netherlands

Application August 6, 1947, Serial No. 767,537
In the Netherlands April 16, 1943

Section 1, Public Law 690, August 8, 1946
Patent expires April 16, 1963

3 Claims. (Cl. 178—23)

The invention relates to receiving devices or teleprinters preferably provided with a type wheel.

In the receiving devices of the usual start-stop teleprinters, the signal elements of a telegraph signal are temporarily recorded in an intermediate mechanism to effect thereafter the positioning of a printing device. In the known printing devices which are provided with type levers or with type wheels, the time for positioning and printing is of such a magnitude that the time between the wiping moment of the last signal element and that of the first signal element of the next signal is not sufficient for the printing of a received signal element. The printing as a rule takes place independently of further incoming signals. After the positioning of the printing device, the intermediary mechanism, which forms a recording device or register, is released to record temporarily the next signal which directly succeeds to the first received signal and records this signal until the printing device has become available again. This overlapping of the reception of a signal and the printing are of essential significance for the teleprinters according to the known start-stop-principle in which, if this overlapping were absent, only half the present transmission speed could be obtained. (F. Schwiweck, Fernschreibtechnik, page 45.)

The object of this invention is to provide a receiving-apparatus for teleprinters, in which the selecting of one of a certain number of types is obtained by a number of possible bisections of said number of types, each of the possible number of bisections being caused or prevented by the respectively marking or spacing elements of a received signal at the same time of receiving, in such a way as to reduce the number of parts and springs, needed in the receiving device according to the invention.

In said receiving device use is made no longer of an intermediary mechanism or a recording device for temporarily recording telegraph signal current elements, but, if wanted, the printing device can be positioned by the receiving device in five consecutive stages, under direct control of the five signal elements (if it concerns signals in the five-unit code). In the known receiving mechanisms the position of the armature of the receiving coils is only of importance during the short wiping moments, which means about 20 ms. Such a time is therefore available in order to influence, according to the invention, the positioning device according to the relevant current element. The positioning shaft of the printing device, on which preferably a type wheel is fixed, may under the control of the first unit or element of a signal stay in the starting position or make half a revolution, while the second element of the received signal causes the shaft to stop or to make a quarter of a revolution from the position in which it has stopped under the control of the first signal element, and so on, until the fifth element causes the positioning shaft to make a thirty-second part of a revolution from the position in which it has stopped under the control of the fourth element. In this manner, the shaft may come to occupy thirty-two different positions under the control of the possible combinations of five signal elements. The positioning shaft in known manner is under a constant torque.

Though it is possible to provide a basket with type hammers, preference is given to a type wheel, because the stroke of the additional single type hammer can be kept very small and the positioning occupies little time, while the driving torque needs not be large.

The print of the signal that is positioned on the type wheel follows immediately after the reception of the last signal element which occupies only little time, as the type wheel, appropriate to the nature of the last signal current element need only revolve a thirty-second part of a revolution. Dependent on the applied equipment, the type wheel and the positioning shaft can, when desired, be returned at will to the fixed starting position after the printing.

The speed of operation is the same as in known apparatuses, but due to the absence of a recording device, the apparatus obtained is simpler than the known specimens, and contains less parts and springs so that the operation is more reliable.

According to a feature of the invention use is made of three, parallel mounted, main shafts, and a fixed fulcrum parallel too, said fulcrum being common to a plurality of levers.

As a result of this, the required mechanical equipment may be arranged so as to be most convenient for maintenance. As a further result of this the apparatus according to the invention may be provided with several auxiliary devices of various functions, each of which can be controlled in a similar way, requiring only a few parts and springs.

The invention will now be described in detail with reference to the accompanying drawings.

Figure 5:
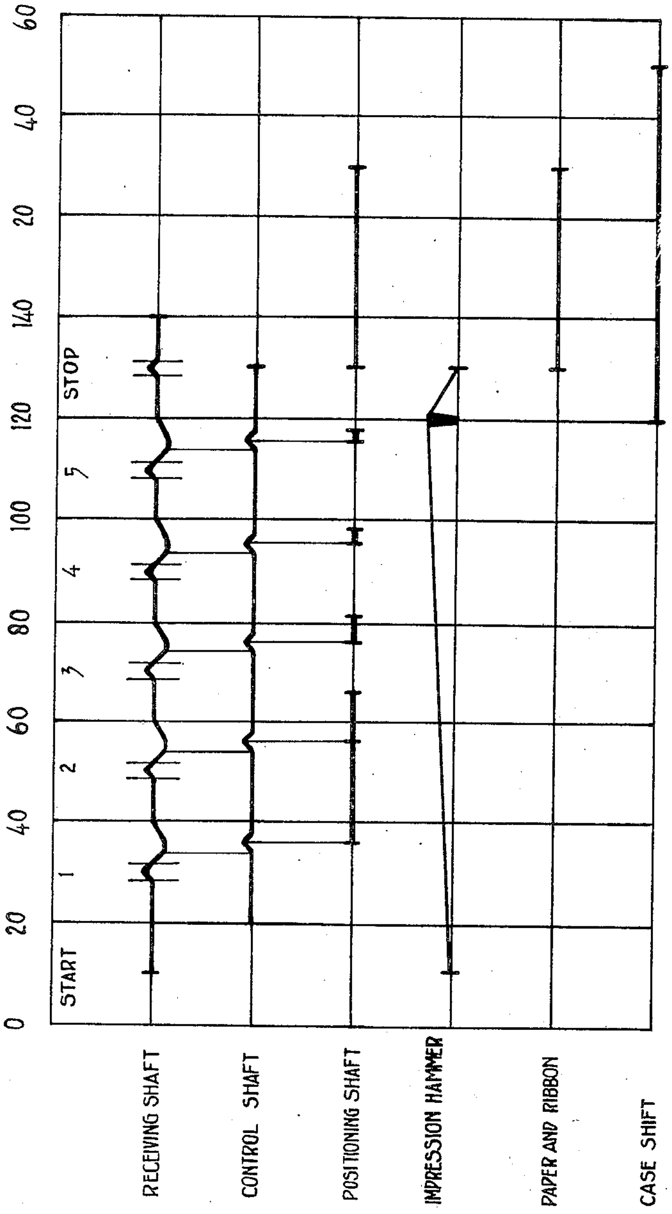

Fig. 5 gives a time diagram of the principal functions of the receiving equipment.

Figure 4:
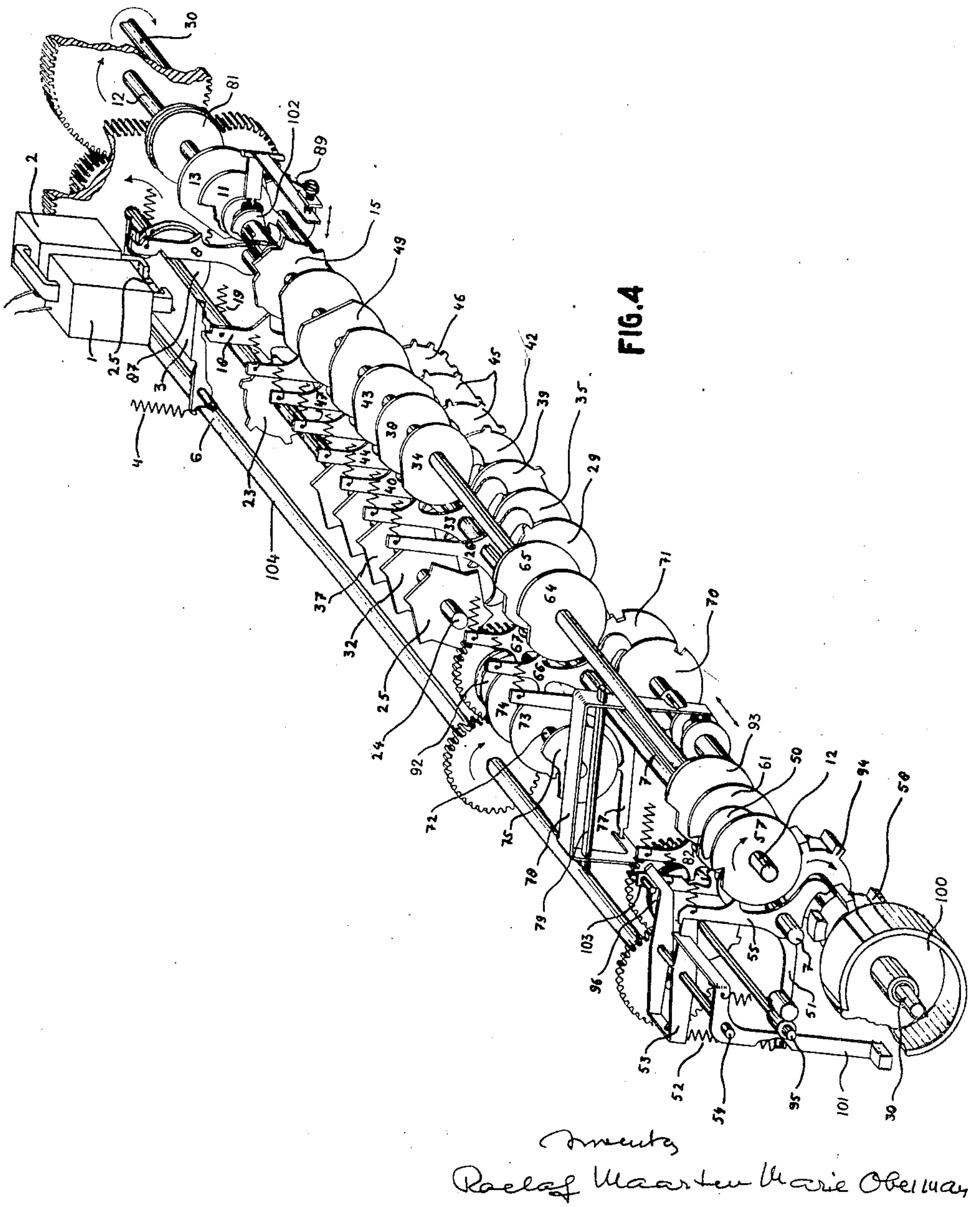
Fig. 4 shows the entire receiving-apparatus in an one-perspective view.

On the basis of Figure 4 the structure of an entire receiving apparatus according to the invention will be summarized. The main parts are: the three parallel shafts, respectively called the receiver shaft 12, the control shaft 24 and the positioning shaft 30, each provided with a plurality of finger discs, and the common fulcrum 7, also parallel to said three shafts, which is provided with a plurality of levers, each of these levers being attended with its accessory spring, said levers acting together with said finger discs on said three shafts.

The driving electromotor, which has not been shown has a rotational capacity of 1500 rev./min. and is directly driving the positioning shaft 30 over the coupling 89. The control shaft 24, the receiver shaft 12 and the auxiliary shaft 104 are driven by the positioning shaft 30 by means of three equal gear stages, each consisting of gears in the ratio of about 1:2. So the smaller gear on the control shaft 24 drives two equal bigger gears, one of which has been fixed on the receiver shaft 12, the other being fixed on the auxiliary shaft 104. The velocities of rotation, thus obtained, are: 1500 rev./min. for the positioning shaft 30; 800 rev./min. for the control shaft 24, and 460 rev./min. for the receiver shaft 12 as well as for the auxiliary shaft 104. Both auxiliary shafts 72 and 95 are driven by said auxiliary shaft 104 over gears of the ratio 1:1, thus obtaining a rotational speed of 460 rev./min. too.

Most to the rear in Figure 4 are mounted the gears, shown in the upper right corner of the figure; before the gears three couplings 81, 87 and 89 are provided; next comes the receiving device consisting of a magnet with windings 1 and 2, the armature 3 of which cooperates with the levers 8 and 18; the former of which being able to start the receiver shaft 12 and to stop it again by means of the cooperating discs 11 and 13; the latter of which controls the possible rotation of the control shaft 24 by means of the cooperating discs 15 and 23.

Between the discs 11 and 15 an orientation device 102 has been mounted, acting in a known manner and causing an adjustable distortion of both parts of the compound receiver shaft 12 with respect to each other.

Before the receiving device the selecting device (separately shown in Figure 2) is mounted, consisting of six stages and an auxiliary stage, said selecting device being represented by five equal discs fixed on the control shaft 24, further by seven levers with their accessory springs, said levers being carried by the common fulcrum 7, further represented by six cam discs mounted on the receiver shaft 12, and by seven finger discs mounted on the positioning shaft 30, each of these finger discs being controlled by one of said levers. Each stage of the selecting device is represented by the cooperation of one of said levers with that one of said discs that is situated in the plane of said lever.

In front of the selecting device, the case shifting device is situated, consisting of an auxiliary shaft 72, provided with a gear, a coupling 92, two finger discs 73 and 74, and an eccentric disc 75, said discs respectively acting together with the levers 66, 67 and 77, which levers are controlled by their accessory springs as well as by the cam discs 64 and 65 and by the discs 70 and 71. The lever 77 also cooperates with the square lever 78, the latter being carried by its fulcrum 79. Said square lever can transport its motion to a tube that can slide over the positioning shaft 30 in longitudinal direction, said tube carrying the two finger discs 58 and 94 and the type wheel 100.

In front of all the devices described so far, the tape shifting device and the printing device are mounted. The tape shifting device includes an auxiliary shaft 95 provided with a gear, the coupling 96, a finger disc and a small reel; furthermore, it includes the lever 82 with its accessory spring, said lever being carried by the common fulcrum 7, and the cam discs 93 and 94, controlling said lever, the latter controlling the possible rotation of the auxiliary shaft 95.

The printing device comprises the three discs 61, 50 and 57 fixed on the receiver shaft 12, and the disc 58, with two rows of notches, fixed on the tube on the positioning shaft 30. Said device furthermore comprises the levers 103, 51 and 55, with their accessory springs, said levers being carried by the common fulcrum 7, and the lever 53 and the impression hammer 101, both carried by the fulcrum 54. The levers 51 and 53 are connected by the spring 52; the type hammer 101 under tension of its accessory spring, is supported in the normal condition, and driven, when a print has to be effected, by the lever 53.

Figure 4 represents the receiving apparatus remaining in the normal condition, when no signals are received, and (with regard to the shifting of the tube that carries the type wheel), remaining in the "letter" receiving position.

It has to be remarked that the apparatus as it is shown in the accompanying figures and as it is described here, only serves as a model of the working-out of the invention. There are no difficulties at all in altering the sequence in which the various parts of the apparatus have been mounted, or in driving the apparatus over another shaft and by means of an electromotor of less rotational capacity than the ones used in the described model.

The working of the apparatus according to the invention will now be described in detail, referring to the drawings.

The receiving coils 1 and 2 of the receiving magnets in a teleprinter (Fig. 1) keep in spacing position the armature 3 attracted in opposition to the armature spring 4. The armature 3 is pivoted at the fulcrum 6 and bears an abutment 5 which prevents the coupling lever 8, which bears on the fixed shaft 7, from moving to the right under the action of the spring 9. The coils 1 and 2 are without current at a start impulse of a telegraph signal so that the armature 3 releases in consequence of the operation of the spring 4. When armature 3 is attracted, the abutment 5 releases the coupling lever 8, which moves to the right about the fulcrum 7 owing to the operation of the spring 9. The upper part of lever 8 is bent through a right angle to form a projection which normally rests against the abutment 5 and passes over said abutment when the armature releases a copper plate 25 fixed to the coil ensures a minimum gap in normal position. When lever 8 is moved by spring 9, the abutment 10 is moved downward. By its cooperation with a finger disc 11, the abutment 10 prevented the rotation of the receiver shaft 12. By lifting the abutment 10 from the finger disc 11, the receiver shaft 12 is released for making one revolution. The time between the beginning of the starting impulse and the starting of the receiver shaft 12 should be about 10 ms.

The receiver shaft makes one revolution in about 130 ms. in a device for the reception of signals in the usual five-unit code with a transmission speed of 50 bauds. The invention can, however, be applied to apparatus with other start-stop codes and other transmission speeds.

At the beginning of the revolution of the receiver shaft 12, the coupling lever 8 is pushed back past the starting position by the cam disc 13 and the projection 14 so that the abutment 10, in cooperation with the finger disc 11, stops receiving shaft 12 after one revolution. The pushing back of the coupling lever 8 can take place about 15 ms. after the start of the receiver shaft 12, or 25 ms. after the beginning of the starting impulse of the received telegraph signal. This moment occurs just before the wiping interval of the first signal element, and the armature 3 is still in released condition at that moment. The pushing back of the coupling lever 8 takes place to a position to the left of the starting position in order not to hinder the movements of the armature 3 when the signal elements are received.

Figure 1:
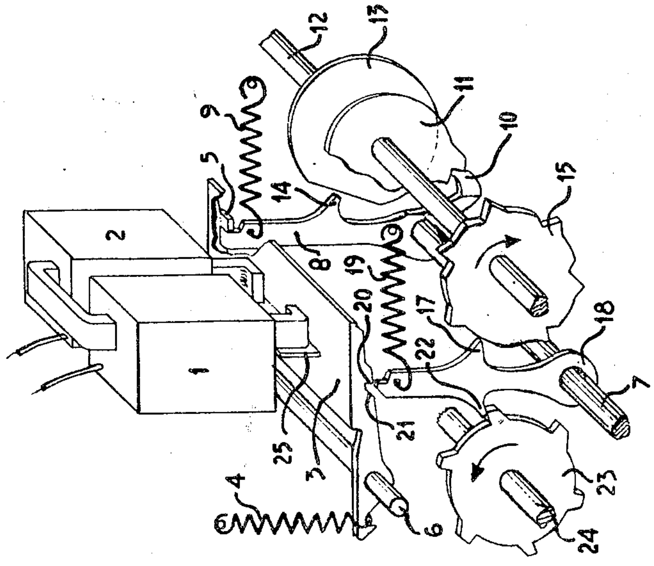
Fig. 1 represents the receiving mechanism.

Figure 1 shows the receiving mechanism during the wiping of the signal elements of a telegraph signal. In the invention, use is made of the known method of the mechanical holding of the armature, which is attracted by the receiving coils when the signal element is a spacing one and is released again while locking the holding lever when the element is a marking one. In known manner, by means of an orientation device, which is not shown in Figure 1 (but is shown in Fig. 4), the finger disc 15 can be connected to the finger and cam discs 11 and 13 so that the functions performed by the cam disc during its rotation take place at a particular, adjustable time after the receiver shaft 12 has started. In Figure 1, the finger disc 15 and the finger and cam discs 11 and 13 are unmovably fixed on the receiving shaft 12. In Fig. 6, however, the receiving shaft 12 is interrupted by said orientation device 102. In Fig. 4, the finger disc 15 has six fingers and five notches following the first five fingers. This finger disc is shown in normal position.

The distribution of the fingers on the circumference is such that when the receiver shaft 12 has started correctly and the number of revolutions is the right one, projection 17 is pushed six times to the left at about the middle of the received signal elements. The wiping lever 18 which, by means of the spring 19 presses the projection 17 against the finger disc 15, consequently moves six times to the left during each revolution of the receiver shaft 12. When the armature 3 is in the released position, it is held in front of the receiving coils 1 and 2 by pressure of the wiping lever 18 against the slanting parts 20 or 21 of the armature 3 and kept by these coils when the relevant impulse is a spacing one, while the armature 3 is released when the wiped element was a marking one at the time the wiping lever 18 has reached the utmost left hand position.

If a spacing signal impulse is wiped, the armature 3 remains operated. When the receiver shaft 12 continues its revolution, the wiping lever 18 falls back into the hole following the finger of the disc 15. If, however, a marking element is wiped, the wiping lever 18 cannot return into the shown position because the finger disc 15 has revolved far enough which causes the wiper lever 18 to be arrested behind the slanting part 20 of the armature 3.

If the wiping lever 18 during the wiping of the former unit of the signal is locked by the release of the armature 3 or during the wiping of a preceding one, the keeping of the armature 3 on the following unit takes place by the pressure of the wiping lever 18 against the slanting part 21 of the armature 3.

Under particular circumstances, the wiping lever 18 can fall into one of the five notches of the finger disc 15 on the receiver shaft 12. Then the projection 22 of the wiping lever 18 releases the finger disc 23 for a moment so that the control shaft 24 can revolve. By the rotation of the receiver shaft 12, the projection 17 is pushed quickly out of the notch of the finger disc 15 so that the projection 22 again stops the control shaft.

When the wiping lever 18 is locked by a marking element, the projection 17 cannot drop into one of the five notches of the finger disc 15 on the receiver shaft 12. Only when a spacing impulse is wiped, so that the wiping lever 18 after the wiping moment falls into the hole following the relevant finger of disc 15, this lever is pulled by the spring 19 to the right so that immediately after the wiping of a spacing unit of the signal the projection 22 releases the finger disc 23 which is on the control shaft 24 which then starts revolving over a felt coupling 87, shown in Fig. 4 with a proper number of revolutions.

At the middle of the stop impulse, about 120 ms. after the starting of the receiving shaft 12, the lever 18 holds the armature 3 in front of the receiving coils 1 and 2, and the armature is kept by these coils as the stop impulse is a spacing one. Thereby the coupling lever 8 is locked behind the abutment 5 until a new marking-start-impulse is received. After the middle of the stop impulse no more functions are performed by the receiver shaft as the position of this shaft in stopping position is determined by the positioning of the orientation device.

Figure 2:
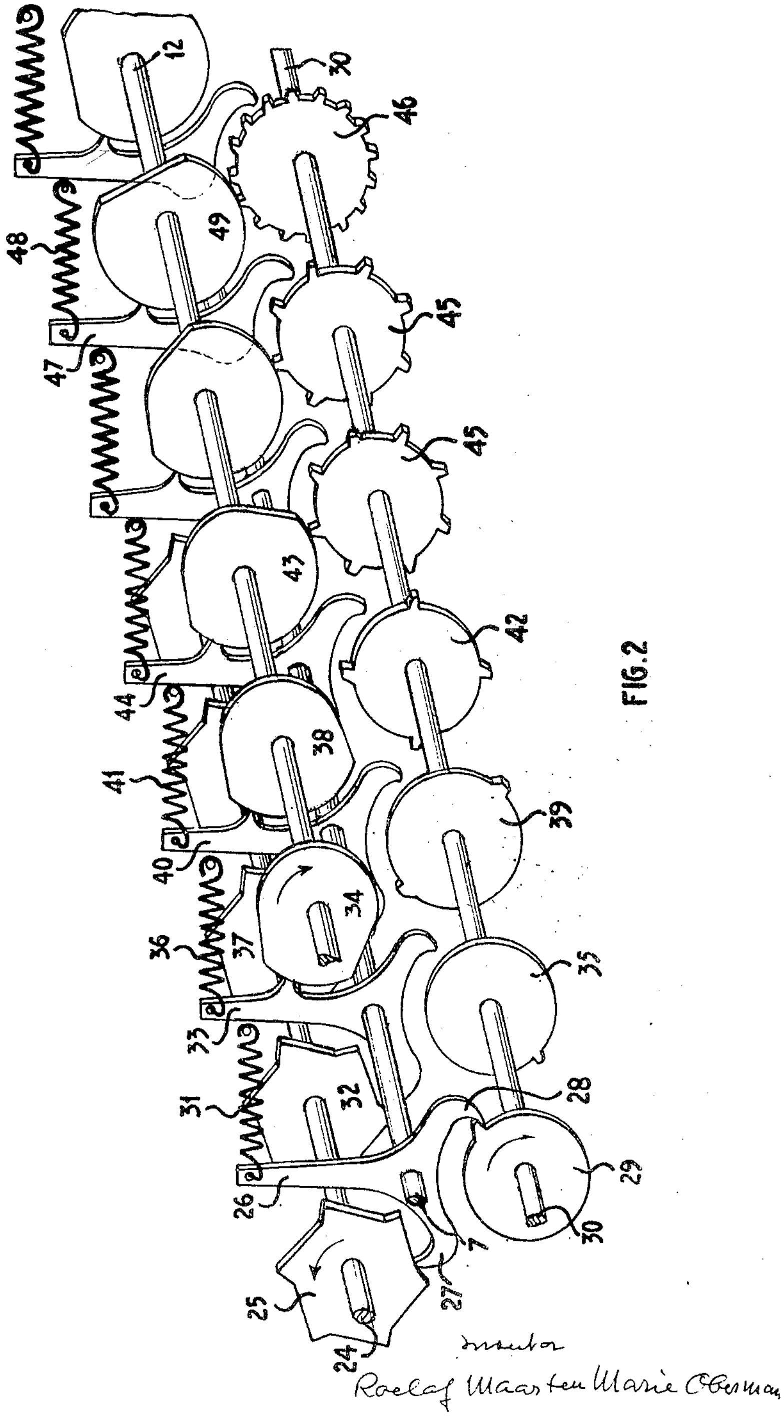
Fig. 2 shows the positioning mechanism of the receiving apparatus.

Figure 2 shows the control of the positioning shaft of the printing device. The receiver shaft 12 has no function in Figure 2, but the control shaft 24 with the finger disc 25 has. It is remarked that all the finger (cam-) discs are shown in the position when no signals are received, i. e. in normal condition.

By revolving the finger disc 25, the control shaft 24 can engage the coupling lever 26 to turn about the fixed fulcrum 7 in opposition to the pull of the spring 31 so that the abutment 28 of the coupling lever is brought out of engagement with the finger disc 29, which is fixed on the positioning shaft 30 of the printing device. The positioning shaft 30 is by means of a felt coupling 89 (Fig. 4) connected to the driving motor of the receiving device so that said positioning shaft starts rotating according to the indicated direction when the coupling lever 26 is shifted by the control shaft 24.

If the first received signal element (this is the impulse after the start impulse) is spacing, the control shaft 24 revolves through an angle corresponding to a tooth and uncouples the positioning shaft 30 of the printing device by means of the coupling lever 26 so that the positioning shaft starts revolving. This positioning shaft cannot make a whole revolution but only a half one; the limitation of the revolution of the positioning shaft 30 is indicated in Figure 2. When the first signal element is marking, the control shaft 24 and the positioning shaft 30 are not moved.

The receiver shaft 12 bears also a cam disc 34 which is shown in the normal condition of the receiver just like the other discs on this shaft. The cam disc 34, in opposition to the operation of the spring 36, keeps the coupling lever 33 in such a position that the finger disc 32 of the control shaft 24 and the finger disc 35 of the positioning shaft can freely revolve under the respective projections of the coupling lever 33. The cam disc 34, which is fixed on the receiver shaft 12, begins revolving after the start of the receiving device.

The cam of this disc is so constructed that the coupling lever 33 is released about simultaneously with the wiping moment of the first signal element. When the first signal element is spacing, the positioning shaft 24 is rotated so as to shift over a tooth of the finger disc 32, owing to which all the coupling levers which are under the action of the discs on the positioning shaft 24 are just rotated in opposition to the operation of the springs so that the positioning shaft 30 is continually released until the last mentioned shaft rotates against the next coupling lever which stops the positioning shaft. The positioning shaft of the printing device makes half a rotation when the first signal impulse is spacing.

In the same manner, the cam disc 38 in Figure 2 releases the coupling lever 40 during the wiping moment of the second signal element. By the operation of the spring 41, this coupling lever 40 limits the rotation of the positioning shaft 30, when the second signal element is spacing, by projecting into the path of a finger of the disc 39 which is 270° out from the normal condition, until the fourth part of a revolution is made when the second element is a spacing.

If the second signal current element is also spacing, the control shaft operates again. The coupling levers 26 and 33 of Figure 2 are rotated in opposition to their springs 31 and 36 so that the positioning shaft 30, independently of the nature of the first signal current element, can begin to revolve. The finger disc 39 bears two fingers displaced against each other by 180°, so that the positioning shaft 30 can be turned only over a fourth part of a revolution.

When both the first two signal elements are marking, the positioning shaft 30 remains in the starting position of Figure 2. When the first signal impulse is spacing, the positioning shaft 30 revolves half a revoluton from the starting position, while this shaft is revolved only a quarter of a revolution from the starting position if the first impulse is marking and the second is spacing. If both, the first and the second, signal impulses are spacing, the positioning shaft 30 makes three quarters of a revolution.

The finger disc 42, which is fixed on the positioning shaft of the printing device, is provided with four fingers. This finger disc is so placed on the shaft that after release the coupling lever 44 by the cam disc 43 of the receiver shaft 12, during the wiping moment of the third signal current element, the rotation of the positioning shaft 30 is limited to an eighth part of a revolution. This revolution is made when the third element is spacing.

The positioning shaft bears in Figure 2 also a finger disc 45 with eight teeth and a finger disc 46 with sixteen teeth which restrict the possible revolution of this shaft, respectively, to a sixteenth and a thirty-second part of a revolution, if, respectively, the fourth and the fifth signal impulses are spacing.

The thirty-two possible combinations of the five signal elements of a telegraph signal in the five-unit code can direct the positioning shaft of the printing device to one of thirty-two various positions to stop it in such a position for making a print. The fact may be noted here that, although the positioning shaft said thirty-two different positions, the finger disc 46 of Figure 2 bears only sixteen teeth.

Figure 3:
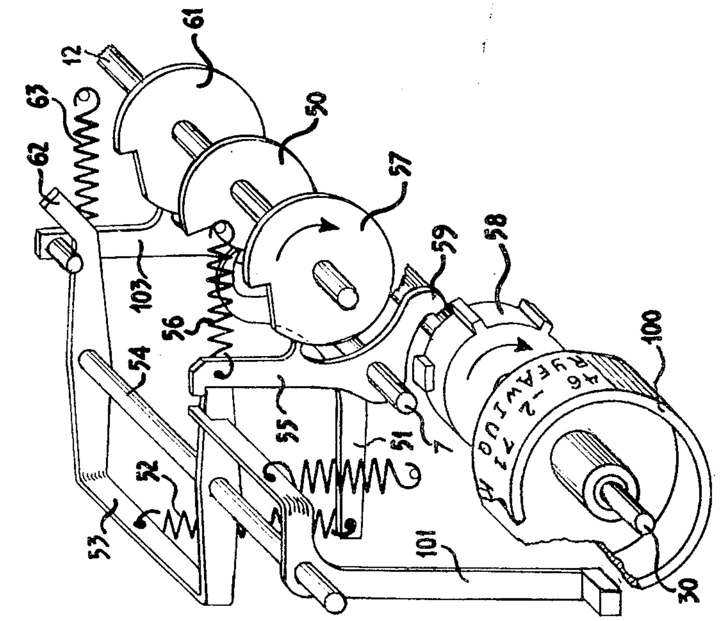
Fig. 3 shows the printing device.

The positioning shaft can be provided with a type wheel as is done in the Figures 3 and 4 on which the letters and figure-types can be distributed in two rows beside each other over the thirty-two different positions of the circumference, e. g. in accordance with the usual five-unit code so that this teleprinter can cooperate with the apparatuses of other kind employing this code.

The function of the receiving device according to the invention is described hereinafter with a shifting of the positioning shaft of the printing device on spacing signal impulses. This function may be reversed so that a shifting of the positioning shaft can only be effected on marking elements. Then the receiving shaft will start to revolve in case of possible line interruptions which is prevented in the described method. By employing a receiving magnet which only reacts to positive or negative impulses, devices can be obtained which are similar to those described here on single current impulses The type wheel can be coupled with a tape printing device as well as with a page printing device of known kind. It is also possible to control a basket with type levers by the rotation of the positioning shaft. In this case, the positioning shaft must be provided with a number of finger discs which actuate one of the type levers, after the positioning of this shaft is terminated.

The method for positioning the printing device shaft described in connection with Figure 2 may, dependent on the equipment of the control shaft and the finger discs that are fixed on it, e. g. for Figure 2, may cause troubles in regard to the time, i. e. when the coupling lever must limit the rotation of the shaft 30 of the printing device. Approximately during the wiping moment the cam disc on the receiver shaft 12 releases the additional coupling lever which cannot limit the rotation of the printer positioning shaft before the control shaft has been shifted over a finger. The shift of the finger disc 45 occupies about 2½ ms. when the rotational speed of this shaft is 1,500 rev./min. For this reason, it may be advisable to provide a blocking lever 47 as shown in Figure 2 between the last and the last but one stage of selecting. The flattened part of the cam disc 49 on the receiver shaft 12 releases the blocking lever 47 just before the wiping moment, which limits the possible rotation of the shaft 30 of the printing device independently of the additional coupling lever. Only when the coupling lever is securely brought into action with the finger disc 45, the auxiliary blocking lever 47 can be shifted back again by the cam disc 49 on the receiver shaft 12. It is self evident that this operation must be effected before the wiping moment of the following signal element.

The print of a received signal can be recorded just before or at the beginning of a signal stop impulse. After this, the coupling levers of Figure 2 are pushed back to the shown position by the additional cam discs on the receiver shaft 12 so that the printer shaft 30 is released and revolved on to the position shown in Figure 2, the starting position.

Figure 3 indicates how a print of the signal positioned by the type wheel can be obtained. In this figure, the device for shifting the tape has been omitted for the sake of clearness.

In said figure, the cam discs 50 and 57 are shown, both fixed on the receiver shaft 12. The receiver shaft 12 also bears a finger disc 50, shaped like a snail's shell which, during rotation of this shaft, puts the spring 52 under tension by means of the intermediary lever 51 which can revolve about the stationary fulcrum 7. The spring 52 tries to make the lever 53 revolve around the stationary fulcrum 54, which motion, however, is prevented in Figure 3 by the upper abutment of the checking lever 55 which, under tension of the spring 56, is pressed against the disc 57 which has also been fixed on the receiver shaft 12. The various discs in Figure 3 have been shown in the position which they assume when the apparatus is in the normal condition. The notch of the disc 57 is so shaped that the checking lever 55 releases the lever 53 at about the beginning of the stop element, i. e. about 110 ms. after the beginning of the rotation of the receiver shaft 12.

Then the lever 53 rotates about the fulcrum 54 under influence of the tension of the spring 52. By this action, the left hand extremity of the lever 53 makes a stroke against the impression hammer 101, which bears the fixed fulcrum 54, said impression hammer causing the print of that character of the positioned type wheel 100 that represents the received signal. After the print has been effected, the type hammer 101 under tension of its accessory spring turns back to its normal position, the latter being shown in Figures 3 and 4. The possibility of moving of the checking lever 55 about its fulcrum is, however, limited by a finger disc 58 fixed on the printer shaft. This disc, together with the type wheel 100, has been fixed on a metal tube which can be shifted in longitudinal direction over the printer shaft 30, but is fixed in such a way with respect to this shaft that it follows all its revolving movements. The disc 58 bears two rows of fingers. The one on which the case shift depends stands under the point 59 of the checking lever 55. The type wheel positions in which no print is caused, e. g. "letters, figures, returning carriage, new line, space, with whom, bell" are characterized on the relevant row of disc 58 by a finger. When the checking lever 55 is released by the finger disc 57, no uncoupling can take place if the projection 59 is above a finger on the disc 58.

The end of a received signal can already be accomplished about 5 to 10 ms. after the wiping of the last signal element. This is due to the fact that the possible rotation of the positioning shaft 30 on the received signal elements becomes smaller and smaller.

This shaft rotates half a revolution on the reception of the first signal element. For the last signal element, the possible rotation is restricted to one thirty-second of a revolution. At a driving rotational capacity of the printing device shaft 30 of 1,500 rev./min. (including the starting time of the coupling), the method mentioned before requires about 2 ms.

It may be remarked that the rotational speed of the printer shaft 30 can be chosen smaller than indicated above. It must be possible for the type wheel to revolve on from the first position to the normal position ($\frac{31}{32}$ rotation) in the time between the beginning of the stop element and the wiping moment of the first signal element of the next telegraph signal.

For this action about 50 ms. is available. If the number of rotations of the printer shaft 30 is chosen in accordance to this, which means 1,200 rev./min., this will not yield difficulties with the positioning of the type wheel on the first signal current element of a following signal element. It is namely not necessary for the type wheel to come to rest between the wiping moments of the first and the second signal element, which means 20 ms., against the limit which is set by the coupling lever for the first signal element. The type wheel should, however, revolve at least so fast that it has securely made ¼ rotation in 20 ms. so that the dropping in of coupling lever 33 cannot cause the type wheel to stop on the wrong position.

Figure 3 also shows the returning of the striking lever 53 which enables again the locking of this lever by the checking lever 55. Just after the release of the striking lever 53, the lever 103 can follow the tension of the spring 63, because the notch of the disc 61 on the receiver shaft 12 admits such in this position. The lever 103 strikes against the sloped part 62 of the lever 53 so that this lever is pressed down and is enabled to be locked under the upper abutment of the checking lever 55.

The case shift which can be effected best by axial shifting of the type wheel 100 on the printer shaft 30 forms a particular kind of print. This requires some time. Figure 4 shows in what manner the shifting of the case according to this invention is obtained. In that figure the device which causes said case shifting has been shown between the selecting device and the devices for shifting the tape and for printing. At that place, the receiver shaft 12 bears two equal discs 64 and 65, which may be combined to one, with such a notch that at the beginning of the stop element the two equal levers 66 and 67 can turn about their fulcrums under the tension of their accessory springs, the latter being partly shown in Figure 4, if the discs 70 and 71 fixed on the positioning shaft 30 admit such by means of their notches. The discs 70 and 71 each have one notch which respective notches are placed under the additional levers only when either the signal to change from the letter into the figure position or the signal to change from the figure into the letter position has been received. Only then one of the two levers can drop in the relevant notch and release the auxiliary shaft 72. The auxiliary shaft 72 is revolved by means of the coupling 92, the other side of which connects with two gears, ratio 1:1, one of which is fixed on the driven auxiliary shaft 104, both auxiliary shafts 72 and 104 thus being revolved with an equal velocity of rotation of about 460 rev./min. The shaft 72 bears two equal finger discs 73 and 74 which have a relative angular displacement against each other of 180°. Figure 4 shows the normal condition of the receiving device in the "letter" position. In the "letter" receiving condition, the shaft 72 is not shifted if further signals to change from the figure into the letter position are received. If, however, the signal to change from letter into figure position is received, the lever 67 of Figure 4 drops with its lower projection into the notch of the disc 71 at the moment the notch of the disc 65 passes the one of its upper projections so that the other upper projection of said lever releases the finger disc 74. Now the auxiliary shaft 72 revolves, making half a rotation. The lever 66 in combination with the finger disc 73 limits the rotation of this shaft by its finger. The shaft 72 bears an eccentric disc 75 against which the lever 77 is pressed by means of its accessory spring. If the signal to change from the letter to the figure position is received, the disc 75 revolves, making half a rotation, owing to which the lever 77 by means of the tension of its accessory spring turns around the common fulcrum 7. Owing to this, the square lever 78 turns around the fulcrum 79 so that the extremity on the right hand side (Fig. 4) makes a backward movement in the direction indicated by the double arrow, thus shifting the tube on shaft 30 from the letter into the figure position, which tube carries the type wheel 100, the finger discs 58 and 94 and two small discs by means of which said extremity of said square lever is capable to communicate its motion to said tube.

As last chief function of a receiving device for teleprinters, the shifting of the tape and the ink ribbon has to be described. It may be remarked that the receiving device according to the invention may be applied to tape printers as well as to page printers, while the page printers may be of the type with moving paper reel as with a fixed reel. The inversion of the movement of the ink ribbon can be effected wholly with known means, so that it need not be explained further. Shifting the paper and the ink ribbon for an equipment as tape printer can e. g. be derived from the same movement. They should be shifted after the print has been effected by the hammer.

Said devices, required when elaborating the invention in a manner as described here, as well as the devices which are to be used when adapting the working-out of this invention e. g. to a page printer, can be arranged in a similar way so as to be most convenient for maintenance, demanding only a few parts and springs. This fact is due to the particular way of installing the three main shafts 12, 24, and 30 and the common fulcrum 7, according to the invention.

In Figure 4 the device to shift the tape is shown. Use has been made of an auxiliary shaft 95 on which are fixed a finger disc provided with a number of fingers (three in this case) which are equidistantly distributed over the circumference of said disc, and a small reel mounted above the type wheel 100, said reel cooperating with a similar reel to transport the tape between the two. Said auxiliary shaft 95 is driven by the shaft 104 by means of two equal gears working together. The coupling 96 couples the auxiliary shaft 95 to one of these gears. Being uncoupled, the auxiliary shaft 95 revolves with the same speed as its driving shaft 104, namely about 460 rev./min. The tape shifting device is completed by two discs and the lever with one lower and two upper extremities, 82. The first disc 94, with two rows of notches, is fixed on the tube on the positioning shaft 30, said two rows of notches commanding whether a shifting of the tape has to be effected or not, in the first mentioned case making it possible to said lever 82 to turn about the common fulcrum 7 when the notch of the second disc 93 fixed on the receiver shaft 12 passes its cooperating upper extremity during the last signal impulse. After the second upper extremity of the lever 82 has uncoupled the auxiliary shaft 95, the latter is rotated with the said speed of 460 rev./min. over an angle, corresponding with the distance between two successive fingers of its accessory finger disc, thus shifting the tape over a regular distance, independently of the further operation of the receiver shaft 12.

In the same way, a bell can be rung. This part is separate from the proper receiving mechanism and it will not be described here.

Figure 5 shows a time diagram of the principal operations of a receiving device for teleprinters as shown in Fig. 4. On the line "receiving shaft," the action of the finger discs is developed which regulate the wiping of the received units of the code and introduce the shifting of the control shaft when a spacing is received. The wiping moments of the various signal elements are indicated by two parallel lines, at about the middle of the impulse. The wiping lever follows the operated finger disc of the receiver shaft when a spacing element is received. The consecutive moments at which the receiver shaft 12 releases the control shaft are indicated by connecting lines between the relevant shafts. The fingers on the control shaft are only indicated in so far as their position relates to the uncoupling moments of the printer device positioning shaft. The possible start moments of the positioning shaft are indicated by the vertical connecting lines between the "positioning shaft" and the "control shaft."

In the diagram of Figure 5 the number of rotations of the positioning shaft is assumed as 1,500 rev./min. Thus. half a revolution of the positioning shaft requires 20 ms. When the first signal element is spacing, the positioning shaft is rotated through half a revolution just between the wiping moments of the first and the second signal elements. The time required by the positioning shaft to be positioned on a second spacing signal under the assumed number of 1,500 rev./min., occupies 10 ms., that for the third spacing element 5 ms., for the fourth 2½ ms. and for the fifth and last spacing signal impulse 1¼ ms., excluding the slipping time of the coupling. Thus, the positioning of the last spacing element requires so little time that it can position the positioning shaft at about the moment when the stop element begins so that at that moment the print can be effected by releasing a spring, which was tensioned by means of a cam shaft shaped like a snail's shell during the rotation of the receiver shaft. The tensioning of the spring and the marking of the print are indicated schematically by the slanting line "impression hammer" and the moment of printing shown in heavy black. Immediately after this, the printing levers are restored to their former positions, while the type wheel is unlocked and revolves on to the starting or normal position. Before the wiping moment of the first signal element of a consecutively wired signal, the type wheel is stopped in the starting position. It need not be explained further that the rotational speed of the type wheel can be chosen smaller to such an extent that the rotation of the positioning shaft is not interrupted in a wrong position when the blocking lever drops in at the wiping moment of a next signal element. After the print, the paper and the ribbon can be shifted together or separately, for which purpose in Figure 5 e. g. 40 ms. has been indicated. This may vary according to the nature of the applied mechanism. The case shift can already commence at the printing moment. With the described apparatus it takes 65 ms.

While I have illustrated and described what I regard to be the preferred embodiment of my invention, nevertheless it will be understood that such is merely exemplary and that numerous modifications and rearrangements may be made therein without departing from the essence of the invention. I claim:

1. Receiving device for teleprinters operating under a telegraph code consisting of a constant number of current elements of equal length comprising: a receiving shaft; means for releasing said receiving shaft for a revolution after every reception of a signal element; a plurality of cam discs secured to said receiving shaft; a positioning shaft arranged parallel to said receiving shaft; a plurality of finger discs secured to said positioning shaft; said finger discs corresponding in number to the number of the signal elements of the code and each having twice the number of fingers than the preceding one; a control shaft arranged parallel to said receiving and positioning shafts; means for releasing said control shaft for part of a revolution upon reception of a signal element; a plurality of finger discs secured to said control shaft; and a plurality of levers having a common fulcrum and being adapted, respectively, for cooperation with the cams and fingers of said discs on said receiving, positioning and control shafts.

2. Receiving device as claimed in claim 1, said means for releasing said receiving shaft including a receiving electromagnet; an armature arranged for attraction by said receiving electromagnet; a finger disc provided with notches and secured to said receiving shaft; a lever arranged for cooperation with the fingers of said disc so as to be moved approximately at the middle of every signal element; said lever in one position holding said armature in front of said receiving magnet so that on attraction of said armature by said receiving magnet said lever falls in a notch of said finger disc and thereby releases said control shaft.

3. Receiving device as claimed in claim 1; a blocking lever and a cam disc secured to said receiving shaft and controlling said blocking lever; said blocking lever being arranged to release in one end position one of said finger discs on said control shaft.

ROELOF M. M. OBERMAN.

REFERENCES CITED

The following references are of record in the file of this patent:

UNITED STATES PATENTS

| Number | Name | Date |
|---|---|---|
| 544,348 | Buckingham | Aug. 13, 1895 |
| 843,508 | White | Feb. 5, 1907 |
| 1,229,201 | Potts | June 5, 1917 |
| 1,548,168 | Pfannenstiehl | Aug. 4, 1925 |
| 2,192,354 | Kleinschmidt | Mar. 5, 1940 |
| 2,329,580 | Bancroft | Sept. 14, 1943 |
| 2,358,477 | Salmon | Sept. 19, 1944 |